UNITED STATES PATENT OFFICE.

JULIUS H. TIEMANN, OF BROOKLYN, NEW YORK.

PROCESS OF REFINING PETROLEUM.

SPECIFICATION forming part of Letters Patent No. 321,465, dated July 7, 1885.

Application filed May 17, 1884. (No specimens.)

*To all whom it may concern:*

Be it known that I, JULIUS H. TIEMANN, of the city of Brooklyn, in the county of Kings, and in the State of New York, have invented a new and useful Improvement in the Process of Refining Petroleum; and I do hereby declare that the following is a full, clear, and exact description of the invention, which will enable others skilled in the art to which it appertains to make and use the same.

My invention relates to the purification of the distillates of petroleum or rock oil.

In the treatment of petroleum for the manufacture therefrom of lubricating or burning-oils, or of the lighter products, it is customary to mix with the oil, at an early stage of the treatment, a certain per cent. of sulphuric acid, as much of which as possible it is desirable subsequently to remove, since it is well known that in the use, for example, of the burning-oils produced from petroleum, the presence of even small quantities of sulphuric acid, or of any compound thereof, is very objectionable, detracting greatly from the light-giving properties, or from what might be denominated the "candle-power" of the oil, clogging or fouling the wick, and giving forth, upon combustion, injurious products.

The object of my invention is entirely to free the distillate from sulphuric acid or any compound thereof, and to produce at once a finished and merchantable product.

Heretofore it has been proposed to remove the sulphuric acid by addition to the oil, even directly after the sulphuric-acid treatment, of lime; but the lime has been slaked, or partially slaked. It has also been proposed to remove the acid from a distillate or from sludge-oil by washing these with water and then employing a hydrate of an alkali, or a compound of an alkali or alkaline earth, to unite with the acid and precipitate, and even to employ an anhydrous compound of the alkalies to take out the water as well as the acid; but in both cases there is a previous washing with water, while in the first case the substance employed to remove the acid is not an anhydrous compound. It has also been proposed to remove the acid from oil by heat, in connection with an anhydrous compound of the alkalies or alkaline earths; but in this case water also is to be removed, and the process is one of redistillation, and none of these procedures completely remove the acid from the oil. I have tried slaked lime without effect.

I believe that failure heretofore to remove all the acid is owing either to mechanical entanglement, as by free acid being locked up in particles of the oil by an envelope of some sulpho compound thereof, undecomposable by a hydrate, or by being wholly in the form of a sulpho compound.

My invention consists in removing sulphuric acid directly or at one operation from petroleum distillates, and producing at once a finished and merchantable product by adding to such distillates next after the acid treatment—that is to say, without the intervention of water or heat—an anhydrous composition of the alkalies, alkaline earths, or metals.

My procedure is as follows: After the oil has been treated with sulphuric acid, I add to it a suitable quantity (say from two to five per cent.) of any anhydrous alkali or alkaline earth or compound thereof, or any anhydrous metallic oxide or carbonate, the point being that the substance employed shall be capable of immediate removal of the sulphuric acid present, whether it be free or in the form of a sulpho or other compound. After adding the anhydrous substance the oil is to be agitated, either by stirring, by shaking, by injection of air, or otherwise, for from half an hour to an hour, (more or less,) as may be found desirable, and at the expiration of the agitation the oil is allowed to rest until clear. The impurities gradually settle to the bottom and may be removed, or the clear liquid may then be drawn off. In the agitation the anhydrous substance seems to exert a mechanical as well as a chemical effect, acting probably as an abradant to scour the particles of oil, the matter thus detached either falling directly to the bottom or being broken up and precipitated by the anhydrous substance, in either case any barrier to the direct union of the anhydrous substance with any inclosed free acid being removed. I have employed with advantage caustic lime, anhydrous potash, anhydrous soda, oxide of magnesia, dry carbonate of baryta, anhydrous carbonate of magnesia, and the carbonates of soda and potash, anhydrous as well as carbonate of lead, which I prefer. It is preferable to introduce the anhydrous substance in the form of powder. After agitation with the anhydrous substance and the requisite settling and removing, there is no subsequent distillation or other treatment. The oil has been subjected to its final treatment and is ready for use.

Having thus fully described my invention, what I claim, and desire to secure by Letters Patent, is—

The process of removing sulphuric acid from petroleum distillates and producing a finished merchantable product, which consists in adding directly to such distillates—that is, next after the acid treatment—an anhydrous alkali, or alkaline earth or composition thereof, or an anhydrous compound of the metals, whereby any washing is avoided, substantially as described.

Dated New York, May 15, 1884.

JULIUS H. TIEMANN.

Witnesses:
 JOHN F. FOLEY,
 FREDK. GIBLIN.